United States Patent
Yen et al.

(10) Patent No.: US 10,621,791 B2
(45) Date of Patent: Apr. 14, 2020

(54) THREE-DIMENSIONAL MODELING METHOD AND SYSTEM THEREOF

(71) Applicant: Industrial Technology Research Institute, Hsin-Chu (TW)

(72) Inventors: Po-Fu Yen, New Taipei (TW); Zhong-Yi Haung, Changhua County (TW); Shang-Yi Lin, Taichung (TW); Kang-Chou Lin, Hsinchu County (TW); Tung-Fa Liou, Hsinchu (TW); Yung-Cheng Cheng, Kaohsiung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 161 days.

(21) Appl. No.: 15/855,266

(22) Filed: Dec. 27, 2017

(65) Prior Publication Data
US 2019/0164350 A1 May 30, 2019

(30) Foreign Application Priority Data

Nov. 24, 2017 (TW) .................................. 106141022

(51) Int. Cl.
*G06T 19/20* (2011.01)
*G06T 3/00* (2006.01)
(Continued)

(52) U.S. Cl.
CPC .......... *G06T 19/20* (2013.01); *G06F 16/5854* (2019.01); *G06T 3/0068* (2013.01);
(Continued)

(58) Field of Classification Search
CPC .... H04N 13/246; H04N 13/282; G06T 19/20; G06T 3/0068; G06T 3/0093; G06T 17/00;
(Continued)

(56) References Cited

U.S. PATENT DOCUMENTS 5,466,892 A 11/1995 Howard et al.
6,556,196 B1 * 4/2003 Blanz ................. G06K 9/00275
345/419
(Continued)

FOREIGN PATENT DOCUMENTS

CN 102338617 A 2/2012
CN 105069226 11/2015
(Continued)

OTHER PUBLICATIONS

Blanz et al., "Fitting a Morphable Model to 3D Scans of Faces", 978-1-4244-1631-8/07 IEEE, 2007. (Year: 2007).*
(Continued)

*Primary Examiner* — Brenda C Bernardi
(74) *Attorney, Agent, or Firm* — WPAT, PC

(57) ABSTRACT

A three-dimensional modeling method and a three-dimensional modeling system are provided. The three-dimensional modeling method includes the steps of: performing a 360-degree three-dimensional scan on a measured object to obtain regional scan data corresponding to a plurality of different scan areas of the measured object; registering the regional scan data to form 360-degree three-dimensional scan data, wherein the 360-degree three-dimensional scan data include three-dimensional spatial coordinate data, curvature data and scan area data of the measured object; basing on the 360-degree three-dimensional scan data to search morphing model data from a database unit; a step of comparing the 360-degree three-dimensional scan data and performing registering and morphing processes on the morphing model data to construct compensated-template three-dimensional model data; and, basing on the compensated-template three-dimensional model data to fill at least one unknown area of the 360-degree three-dimensional scan data.

17 Claims, 9 Drawing Sheets

(51) Int. Cl.
 *G06T 7/33* (2017.01)
 *H04N 13/246* (2018.01)
 *H04N 13/282* (2018.01)
 *G06F 16/583* (2019.01)
 *G06T 17/00* (2006.01)

(52) U.S. Cl.
 CPC ............ *G06T 3/0093* (2013.01); *G06T 7/337* (2017.01); *G06T 17/00* (2013.01); *H04N 13/246* (2018.05); *H04N 13/282* (2018.05); *G06T 2200/08* (2013.01); *G06T 2207/10028* (2013.01); *G06T 2210/44* (2013.01); *G06T 2219/2004* (2013.01); *G06T 2219/2021* (2013.01)

(58) Field of Classification Search
 CPC ........... G06T 7/337; G06T 2207/10028; G06T 2219/2021; G06T 2219/2004; G06T 2200/08; G06T 2210/44; G06F 16/5854
 See application file for complete search history.

(56) References Cited

U.S. PATENT DOCUMENTS

| | | | |
|---|---|---|---|
| 8,363,927 | B2 | 1/2013 | Rutschmann et al. |
| 9,092,657 | B2 | 7/2015 | Ahmad et al. |
| 9,183,631 | B2 | 11/2015 | Taguchi et al. |
| 9,189,889 | B2 | 11/2015 | Huang et al. |
| 9,197,879 | B2 | 11/2015 | Lin et al. |
| 9,552,668 | B2 | 1/2017 | Yang et al. |
| 9,613,465 | B1 | 4/2017 | Tsai et al. |
| 9,697,604 | B2 | 7/2017 | Wang et al. |
| 2016/0335809 | A1* | 11/2016 | Forutanpour ............. G06T 7/50 |
| 2016/0345858 | A1* | 12/2016 | Tromberg .............. A61B 5/067 |
| 2018/0147062 | A1* | 5/2018 | Ay ..................... A61F 2/30942 |

FOREIGN PATENT DOCUMENTS

| | | | |
|---|---|---|---|
| CN | 205656672 | U * | 10/2016 |
| CN | 205656672 | U | 10/2016 |
| JP | 2011-28335 | A | 2/2011 |
| JP | 2011028335 | A * | 2/2011 |
| TW | 201706918 | | 2/2017 |
| TW | I571806 | | 2/2017 |
| TW | I572846 | | 3/2017 |
| TW | I582878 | | 5/2017 |
| TW | I585607 | | 6/2017 |

OTHER PUBLICATIONS

Taiwan Intellectual Property Office, "Office Action", dated Aug. 31, 2018.
Yue Li et al., "An automatic system to reconstruct and repair Telmat scanning model", Nov. 21-22, 2009, pp. 356-359, Third International Symposium on Intelligent Information Technology Application Workshops, IEEE computer society.
Brett Allen et al., "Articulated body deformation from range scan data", Jul. 23-26, 2002, pp. 612-619, Association for Computing Machinery, Inc.
Will Chang et al, "Automatic Registration for Articulated Shapes", Jul. 2-4, 2008, pp. 1459-1468, vol. 27 No. 5, Eurographics Symposium on Geometry Processing.
M. Pauly et al., "Example-Based 3D Scan Completion", Jul. 4-6, 2005 , Eurographics Association Aire-la-Ville, Switzerland, Switzerland.
Brett Allen et al, "The space of human body shapes: reconstruction and parameterization from range scans", Jul. 27-31, 2003, pp. 587-594, ACM.

* cited by examiner

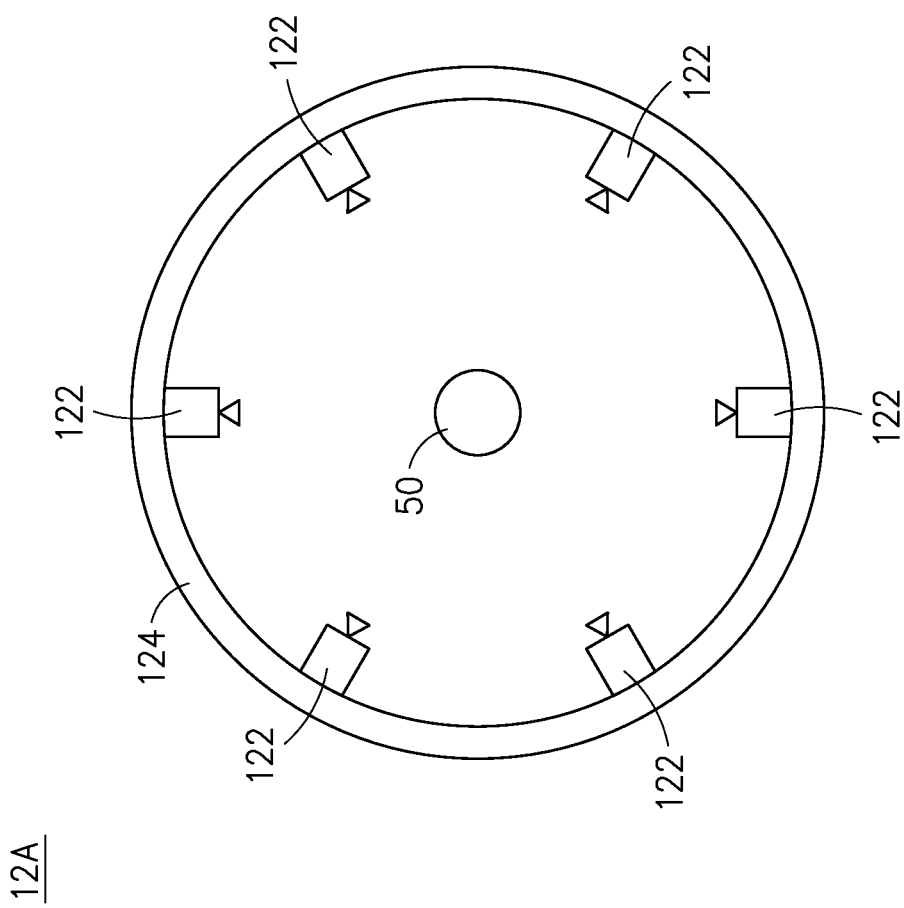

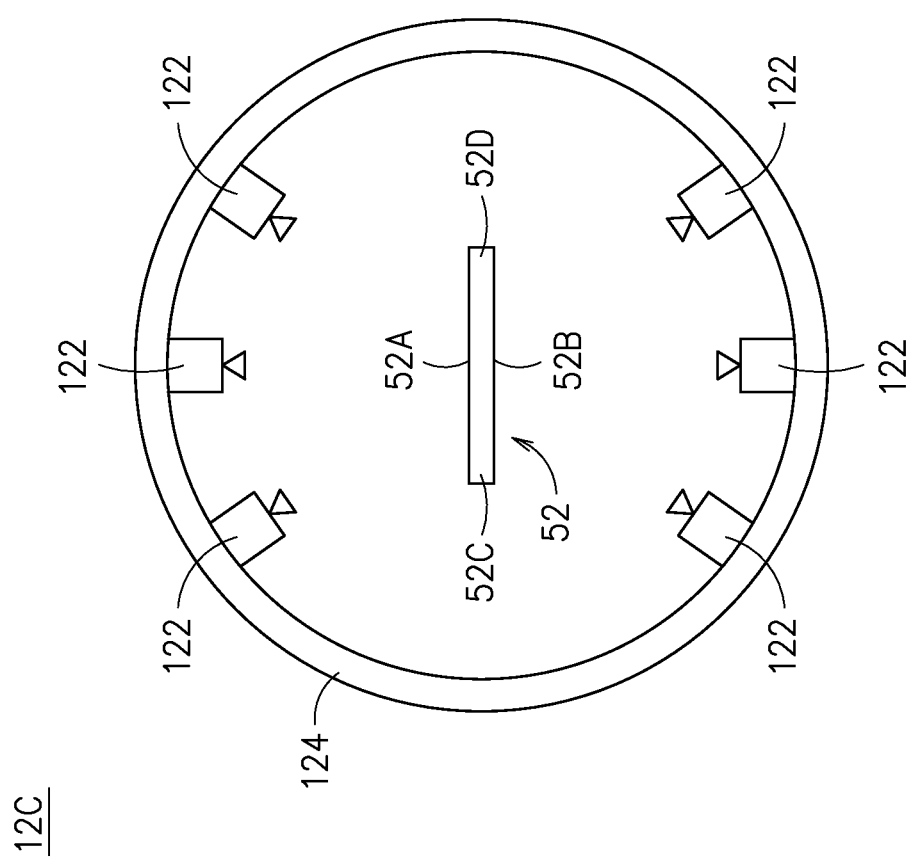

THREE-DIMENSIONAL MODELING METHOD AND SYSTEM THEREOF

CROSS REFERENCE TO RELATED APPLICATION

This application claims the benefits of Taiwan application Serial No. 106141022, filed on Nov. 24, 2017, the disclosures of which are incorporated by references herein in its entirety.

TECHNICAL FIELD

The present disclosure relates in general to a three-dimensional modeling method and a three-dimensional modeling system.

BACKGROUND

As advanced technology progresses, the two-dimensional (2D) scanning and printing have been yet satisfying customers' various needs. For example, an additive manufacturing (AM) technology has been developed and gradually applied to sampling and production for versatile products. Actually, the appearance of the additive manufacturing technology has substantially changed the existing production environment. The additive manufacturing technology has been able to produce a respective three-dimensional solid geometric model by scanning and analyzing a real three-dimensional object. Namely, through a proper three-dimensional object-constructing equipment, the same or at least similar three-dimensional object could be always reproduced.

Regarding an additive manufacturing process, though the current scan technology could be applied to produce the three-dimensional solid geometric model, yet some holes or shadows may exist in the three-dimensional image data obtained from the scan, from which an entire and complete three-dimensional solid geometric model may not be feasible. Thus, the similarity of the three-dimensional object produced by the additive manufacturing technology could be questioned.

Hence, providing an improved three-dimensional modeling method and system thereof is definitely crucial to the skill in the art.

SUMMARY

In one embodiment of this disclosure, the three-dimensional modeling method includes: a step of performing a 360-degree three-dimensional scan on a measured object to obtain regional scan data corresponding to a plurality of different scan areas of the measured object; a step of registering the regional scan data to form 360-degree three-dimensional scan data, wherein the 360-degree three-dimensional scan data include three-dimensional spatial coordinate data, curvature data and scan area data of the measured object; a step of basing on the 360-degree three-dimensional scan data to search morphing model data from a database unit; a step of comparing the 360-degree three-dimensional scan data and performing registering and morphing processes on the morphing model data to construct a compensated-template three-dimensional model data; and, a step of basing on the compensated-template three-dimensional model data to fill at least one unknown area of the 360-degree three-dimensional scan data.

In another embodiment of this disclosure, the three-dimensional modeling system includes a three-dimensional image-data capturing unit, a database unit and a three-dimensional modeling unit. The three-dimensional image-data capturing unit is to output 360-degree three-dimensional scan data, wherein the 360-degree three-dimensional scan data include three-dimensional spatial coordinate data, curvature data and scan area data of a measured object. The database unit, coupling the three-dimensional image-data capturing unit, is to access a plurality of different-type three-dimensional modeling data. The three-dimensional modeling unit, coupling the database unit and the three-dimensional image-data capturing unit, bases on the 360-degree three-dimensional scan data to construct compensated-template three-dimensional model data from the database unit, and further bases on the compensated-template three-dimensional model data to fill at least one unknown area of the 360-degree three-dimensional scan data, wherein the at least one unknown area includes at least one boundaryless open area.

Further scope of applicability of the present application will become more apparent from the detailed description given hereinafter. However, it should be understood that the detailed description and specific examples, while indicating embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 2A is a schematic view of an embodiment of the three-dimensional image-data capturing unit of FIG. 1;

FIG. 2C is a schematic view of a further embodiment of the three-dimensional image-data capturing unit of FIG. 1;

DETAILED DESCRIPTION

Figure 1:
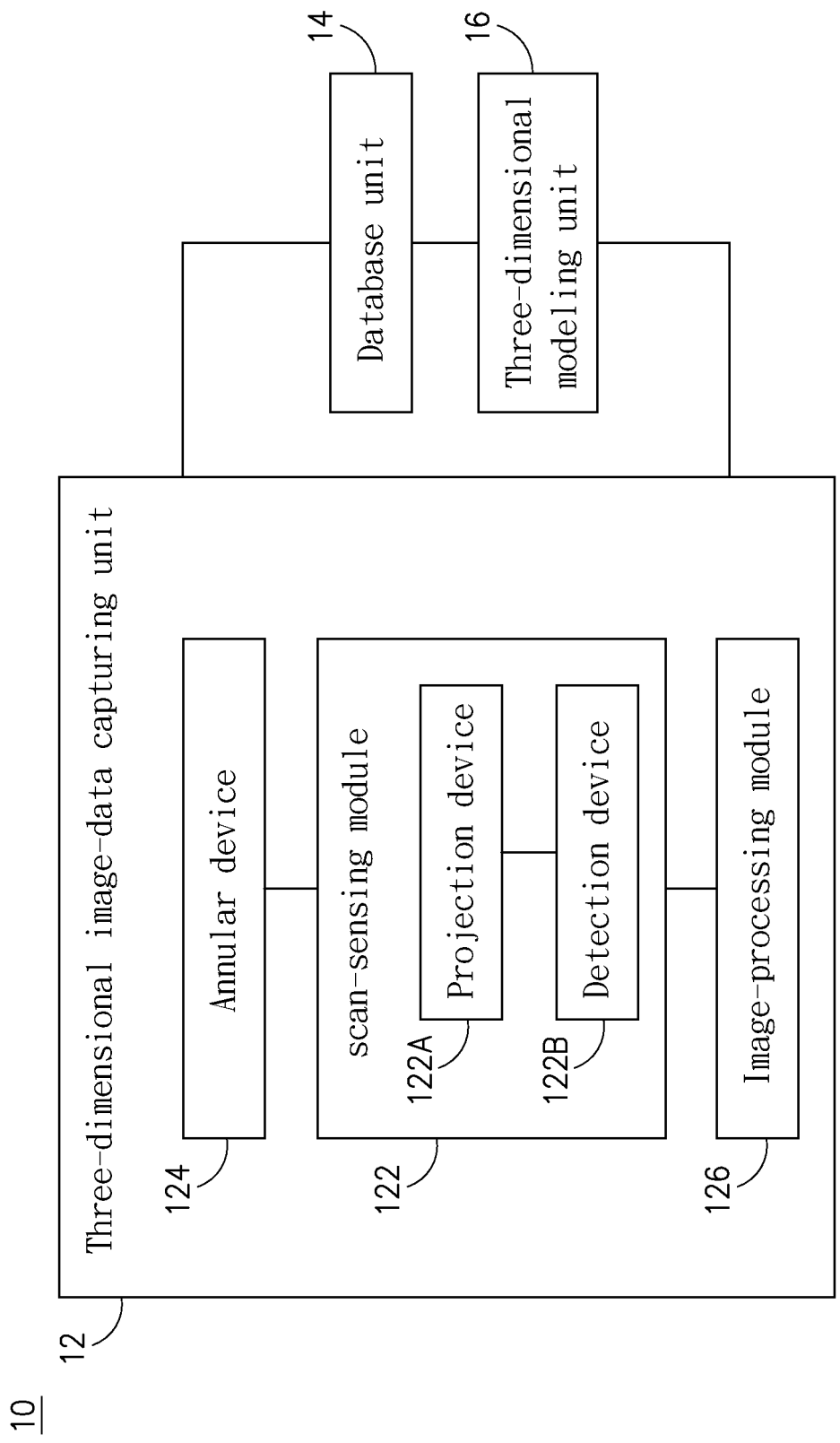
FIG. 1 is a schematic block view of an embodiment of the three-dimensional modeling system in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a schematic block view of an embodiment of the three-dimensional modeling system is shown. The three-dimensional modeling system 10 includes a three-dimensional image-data capturing unit 12, a database unit 14 and a three-dimensional modeling unit 16. In this embodiment, a measured object is arranged in a stationary state for the three-dimensional image-data capturing unit 12 to perform thereupon a 360-degree three-dimensional scan, so that corresponding 360-degree three-dimensional scan data could be outputted. The three-dimensional image-data capturing unit 12 includes at least one scan-sensing module 122, at least one annular device 124 and an image-processing module 126. The scan-sensing module 122, furnished to the annular device 124, is to form a 360-degree scan structure. The scan-sensing module 122, coupled with the image-processing module 126, could be a depth image-capturing device. The scan-sensing module 122 includes a projection device 122A and a detection device 122B, where the projection device 122A is coupled with the detection device 122B. The projection device 122A for projecting a projection pattern having feature points onto the measured object could be an optical projection device, a digital projection device, or any visible or invisible light projecting device. In one embodiment, the projection device 122A is preferred to be an infrared projecting module, and the detection device 122B, having at least a sensor capable of detecting the wavelength of the projecting light from the projection device 122A, is to detect reflected lights and scattered lights from the measured object upon the projecting of the projection device 122A, so as to capture a corresponding image of the projection pattern after being projected onto the measured object. Thereupon, corresponding point cloud data with known three-dimensional coordinates could be obtained. The detection device 122B, an electronic device capable of image-capturing such as a camera, includes, but not limited to, one or plural CCD's (Charge coupled devices) or CMOS's (Complementary metal-oxide semiconductors).

The image-processing module 126, embodied by hardware (IC for example), software (programmed commands executed by a processor for example), or a combination of hardware and software, could perform a series of image-processing procedures (such as feature extraction, feature points registering and image alignment and so on) upon the image data obtained by the scan-sensing module 122. The database unit 14 is coupled with the three-dimensional image-data capturing unit 12. The three-dimensional modeling unit 16 is coupled with the database unit 14 and the three-dimensional image-data capturing unit 12. Upon such an arrangement, the database unit 14 could be used for accessing a plurality of versatile three-dimensional modeling data, the three-dimensional image-data capturing unit 12 could perform the 360-degree three-dimensional scan upon the measured object so as to output the 360-degree three-dimensional scan data, the three-dimensional modeling unit 16 could perform a series of machine learning and processing procedures upon the 360-degree three-dimensional scan data, compensated-template three-dimensional model data could then be constructed in the database unit 14, and thus the compensated-template three-dimensional model data could be used to fill and/or regenerate the holes and/or shadows in the 360-degree three-dimensional scan data.

Referring now to FIG. 2A, a schematic view of an embodiment of the three-dimensional image-data capturing unit of FIG. 1 is shown. In this embodiment, the annular device 124 in the three-dimensional image-data capturing unit 12A is shaped largely to be an annular structure. A quantity of the scan-sensing modules 122 could be six. These six scan-sensing modules 122 are individually connected with the annular device 124, so that an annular multi-sensor 360-degree scan structure could be formed. The measured object 50, arranged in the annular device 124, could be any body of a user with a cylindrical shape, such as human limb, trunk or head. With the measured object 50 in a stationary state inside the annular device 124, individual scan-sensing modules 122, distributed to six different positions at the annular device 124 for charging scanning upon six different scan areas, could form an annular multi-sensor 360-degree scan structure. According to different sizes of individual measured objects 50, the annular device 124 could be shifted to comply with the measured object 50, such that effective scanning and measuring thereupon could be performed. Nevertheless, it shall be understood that the 360-degree scan structure of this disclosure is not limited to the aforesaid structuring. By having the arrangement of these six scan-sensing modules 122 as an example, an equal-angling distribution is applied to arrange these six scan-sensing modules 122 to an inner sidewall of the annular device 124. In other embodiments not shown here, these six scan-sensing modules 122 could also be arranged to the inner sidewall of the annular device 124 in an equal-spacing manner. In this disclosure, these six scan-sensing modules 122 could be arranged to the inner sidewall of the annular device 124 in a varying spacing or angling manner. In addition, by having the six scan areas of the corresponding scan-sensing modules 122 as an example, each of the six scan-sensing modules 122 could be assigned to be responsible for a 60-degree scan area. In embodiments not shown here, these six scan-sensing modules may have their specific scan areas, equally or unequally. The number of the scan-sensing modules is dependent on the arrangement of scan areas. For example, if a scan-sensing module is designed to be in charge of a 90-degree scan area, then at least four scan-sensing modules are required. In addition, by having the annular device 124 of FIG. 2A as the example, only one annular device 124 is provided. In other embodiments not shown here, two annular devices could be provided. One of the annular devices could load six scan-sensing modules, with each of the scan-sensing modules to respond for a specific scan area while another of the annular devices provides at least one scan-sensing module to respond for the scan upon a more complicate region or a region needed to be specifically observed on the measured object. Alternatively, in the case of six scan-sensing modules and two annular devices, the first annular device connects three scan-sensing modules, while the second annular device connects the other three scan-sensing modules.

Figure 2B:
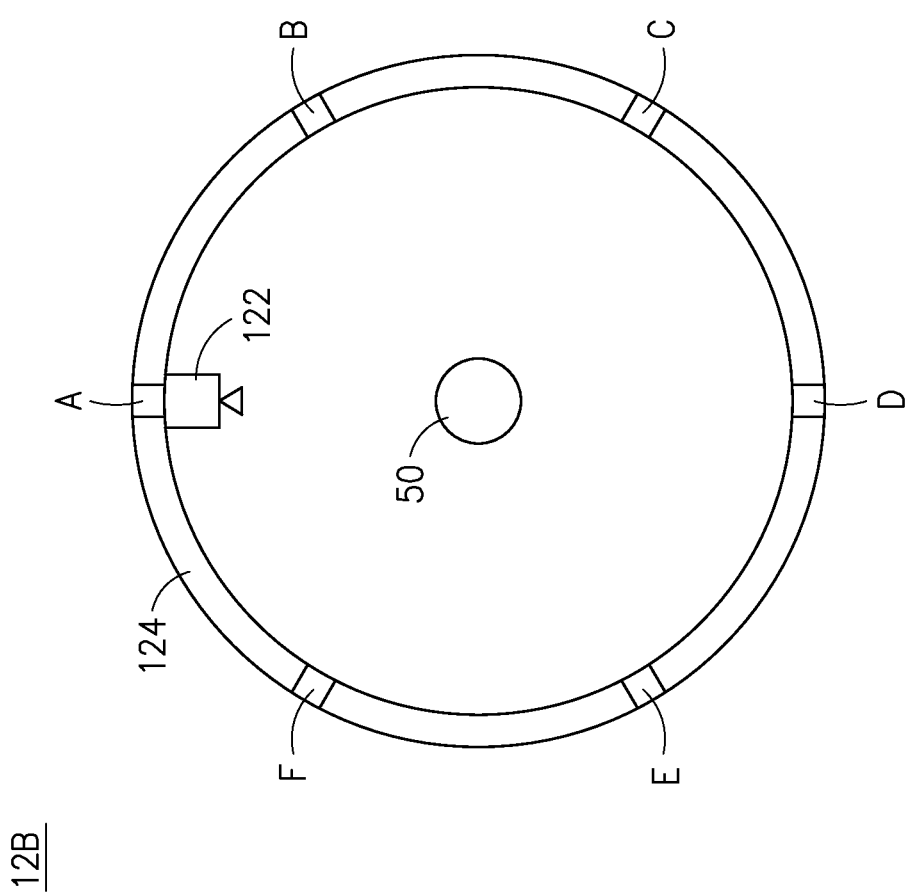
FIG. 2B is a schematic view of another embodiment of the three-dimensional image-data capturing unit of FIG. 1.

Regarding the number of the scan-sensing modules 122, in FIG. 2A, six scan-sensing modules 122 are provided. However, it shall be understood that the number of the scan-sensing modules 122 in this disclosure is not limited to a specific number. In another embodiment shown in FIG. 2B, the three-dimensional image-data capturing unit of FIG. 1 is schematically shown. In this embodiment, since the three-dimensional image-data capturing unit 12B is similar to that 12A of FIG. 2A, elements with the same functions are assigned by the same numbers, and details thereabout would be omitted herein. In the following description, only the differences in between are elucidated. In this embodiment, the three-dimensional image-data capturing unit 12B is furnished with one single scan-sensing module 122. In addition, the annular device 124 is rotational and set to have at least one scan position. As shown in FIG. 2B, the annular device 124 has a first scan position A, a second scan position B, a third scan position C, a fourth scan position D, a fifth scan position E and a sixth scan position F (six scan positions totally). Upon such an arrangement, by arranging the measured object 50 in the stationary state, the scan-sensing module 122 is firstly located at the first scan position A of the annular device 124 for performing scanning upon the measured object 50. Then, by rotating the annular device 124, the scan-sensing module 122 be registered orderly to the second scan position B, the third scan position C, the fourth scan position D, the fifth scan position E and the sixth scan position F, for performing respective scanning at every individual positions upon the measured object 50, such that scan areas of the measured object 50, with respect to the first scan position A through the sixth scan position F, could be scanned by the same scan-sensing module 122. Thereupon, a 360-degree scan structure could be established. In another embodiment, with a stationary annular device 124, the scan-sensing module 122 could be displaced to any position from the first scan position A to the sixth scan position F of the annular device 124, such that a 360-degree scan structure could be established. In other embodiments not shown here, the number and locations of the scan positions at the annular device could be adjusted, so that functions of the expected 360-degree scan structure could be achieved.

In other embodiments in accordance with this disclosure, mounting positions of the scan-sensing modules could be adjusted according to the pattern of measured object. As shown in FIG. 2C, a further embodiment of the three-dimensional image-data capturing unit 12C as a 360-degree scan structure is shown. Since the three-dimensional image-data capturing unit 12C is largely resembled to the three-dimensional image-data capturing unit 12A of FIG. 2A, elements with the same functions are assigned by the same numbers, and details thereabout would be omitted herein. In the following description, only the differences in between are elucidated. In this embodiment, the measured object 52 could be a palm, a foot or the like body portion of a user. As shown in FIG. 2C, the measured object 52, in a lateral side view, could be assigned to have an upper half portion 52A, a lower half portion 52B, a left half portion 52C and a right half portion 52D. Each of the upper half portion 52A and the lower half portion 52B is larger in area than any of the left half portion 52C and the right half portion 52D. Namely, the measured object 52 is structured to have a flat shape, and so the scannable area of the left half portion 52C or the right half portion 52D is smaller than that of the upper half portion 52A or the lower half portion 52B. Therefore, in the case that a portion of the measured object 52 to be observed is at the upper half portion 52A or the lower half portion 52B, the mounting positions of individual scan-sensing modules 122 in this embodiment could be adjusted according to the pattern of the measured object 52. By setting the measured object 52 in the stationary state, three scan-sensing modules 122 could cover the upper half portion 52A and part of the left half portion 52C and the right half portion 52D, while another three scan-sensing modules 122 would cover the lower half portion 52B and another part of the left half portion 52C and the right half portion 52D, such that a 360-degree scan structure could be formed. In addition, it shall be understood that, in the aforesaid FIG. 2A through FIG. 2C, though all the annular devices 124 are in a round annular structure, yet this disclosure does not limit the shape of the annular device. In other embodiments not shown here, the annular device could be a rectangular annular structure, a polygonal annular structure or any the like annular structure.

Figure 3:
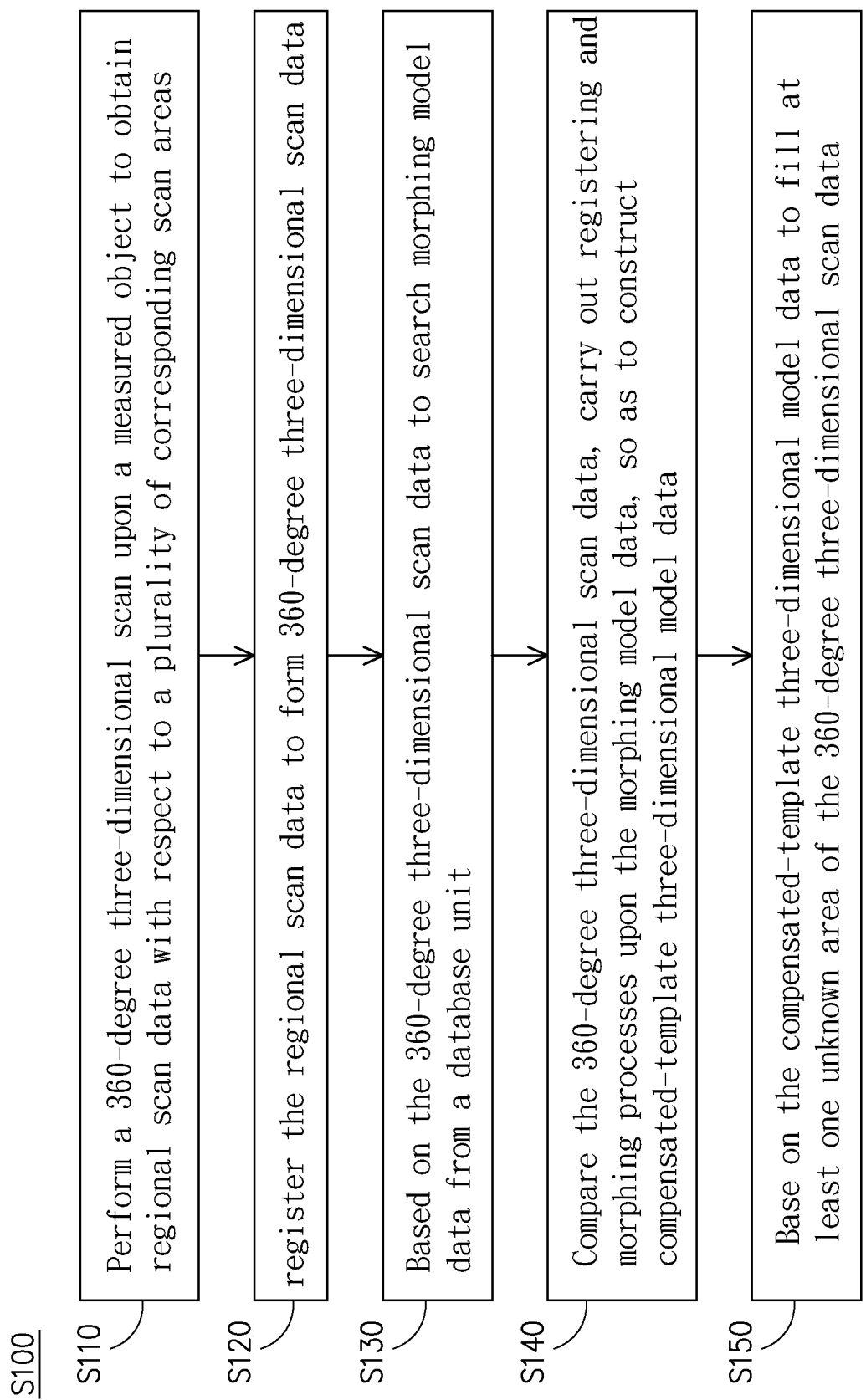
FIG. 3 is a schematic flowchart of an embodiment of the three-dimensional modeling method in accordance with this disclosure.
Figure 4:
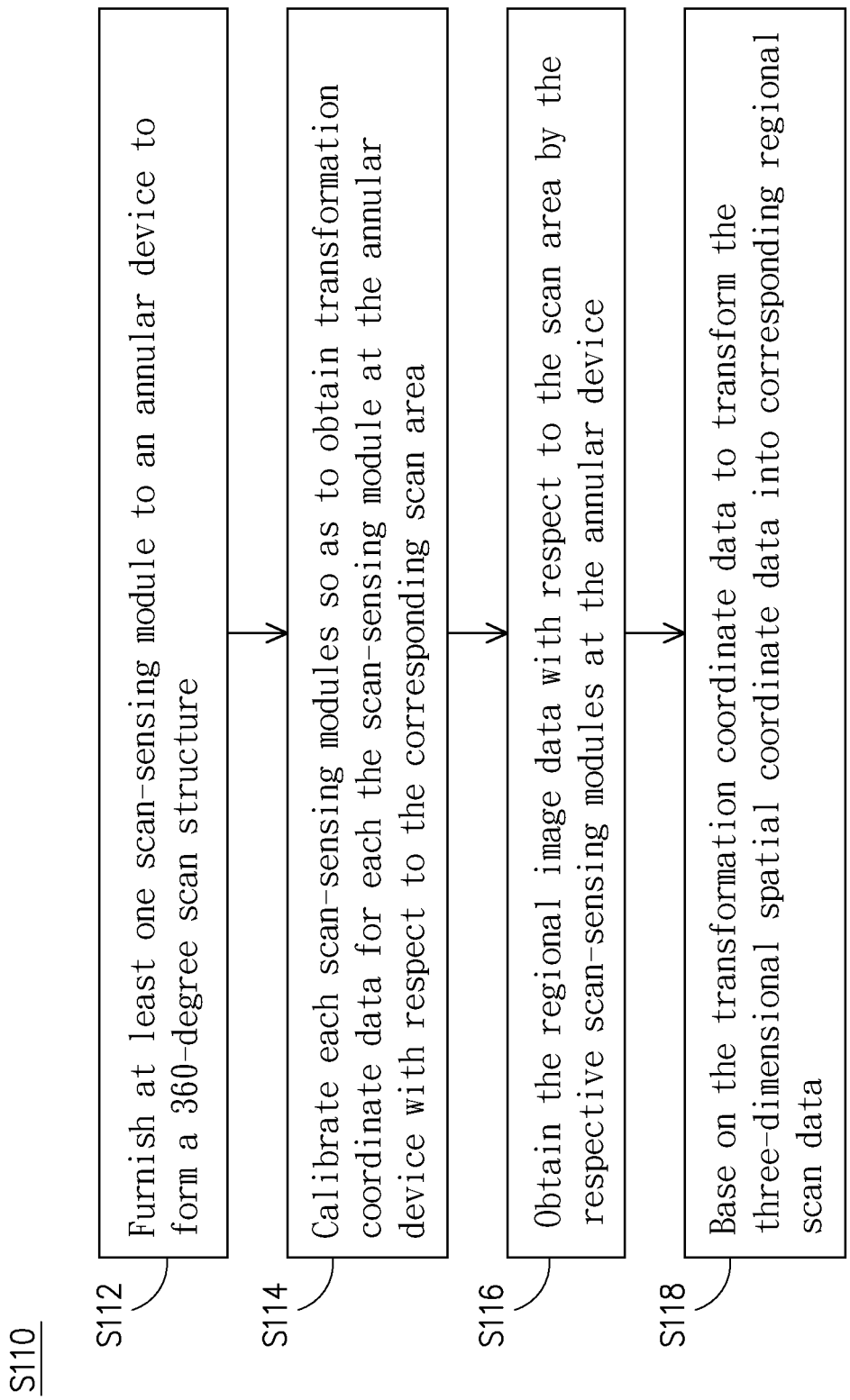
FIG. 4 is a schematic flowchart of an embodiment of Step S110 of FIG. 3.

Referring now to FIG. 3, a schematic flowchart of an embodiment of the three-dimensional modeling method in accordance with this disclosure is shown. This embodiment S100 is applicable to the three-dimensional modeling system 10 of FIG. 1. In this embodiment as shown, the three-dimensional modeling method S100 includes Step S110 to Step S150 as follows. In Step S110, a 360-degree three-dimensional scan is performed upon a measured object so as to obtain a plurality of regional scan data with respect to a plurality of corresponding scan areas on the measured object. In details, as shown in FIG. 4, a schematic flowchart of an embodiment of Step S110 of FIG. 3 is shown. In this embodiment, the Step S110 further includes the following steps: Step S112~Step S118. In Step S112, at least one scan-sensing module is mounted onto an annular device, so that a 360-degree scan structure could be formed. By setting the measured object to a stationary state, then the three-dimensional image-data capturing unit 12 could perform the 360-degree three-dimensional scan upon the measured object. In this disclosure, the 360-degree scan structure is not limited to any specific embodiment. In FIG. 2A, the three-dimension image-data capturing unit 12A applies multiple scan-sensing modules 122 to form the 360-degree scan structure. As shown, 6 scan-sensing modules 122 are distributed onto the inner sidewall of the annular device 124 in an equal-angling manner so as to form a 360-degree scan structure with multiple detecting heads. In other embodiments not shown here, these six scan-sensing module may be arranged onto the inner sidewall of the annular device in an equal-spacing, non-equal-angling or non-equal-spacing manner. In addition, regarding the scan areas of the scan-sensing modules 122, the six scan-sensing modules 122 of FIG. 2A are responsible for individual 60-degree scan areas. In an embodiment not shown here, these six scan-sensing modules may be assigned to respective scan regions with different areas, or a different number of the scan-sensing modules could be prepared according to the arrangement of the scan areas. For example, four scan-sensing modules are evenly distributed to four 90-degree scan areas. On the other hand, regarding the number of the annular devices 124, typically in FIG. 2A, a single annular device 124 is applied. However, in other embodiments not shown here, two annular devices could be included so as to form a multi-ring multi-sensor 360-degree scan structure. In an example having two annular devices, the first annular device could be furnished with six scan-sensing modules, and the second annular device could be prepared by at least one scan-sensing module to scan at least one complicate region or specific observed regions on the measured object. In another example having two annular devices and six scan-sensing modules, the first annular device could be furnished with three of the six scan-sensing modules, while the second annular device is furnished with the other three scan-sensing modules. In another embodiment as shown in FIG. 2B, the annular device 124 of the three-dimensional image-data capturing unit 12B is furnished with one single scan-sensing module 122. By rotating the annular device 124, the scan-sensing module 122 could register at different predetermined positions at the annular device 124 (six positions in FIG. 2B) for scanning. Alternatively, the single scan-sensing module 122 could be displaced to different positions of the annular device 124. Thereupon, the 360-degree scan structure as described above could be obtained functionally. In another embodiment, the mounting positions of the scan-sensing modules could be adjusted according to the pattern of the measured object; for example, the three-dimensional image-data capturing unit 12C in FIG. 2C.

Figure 5:
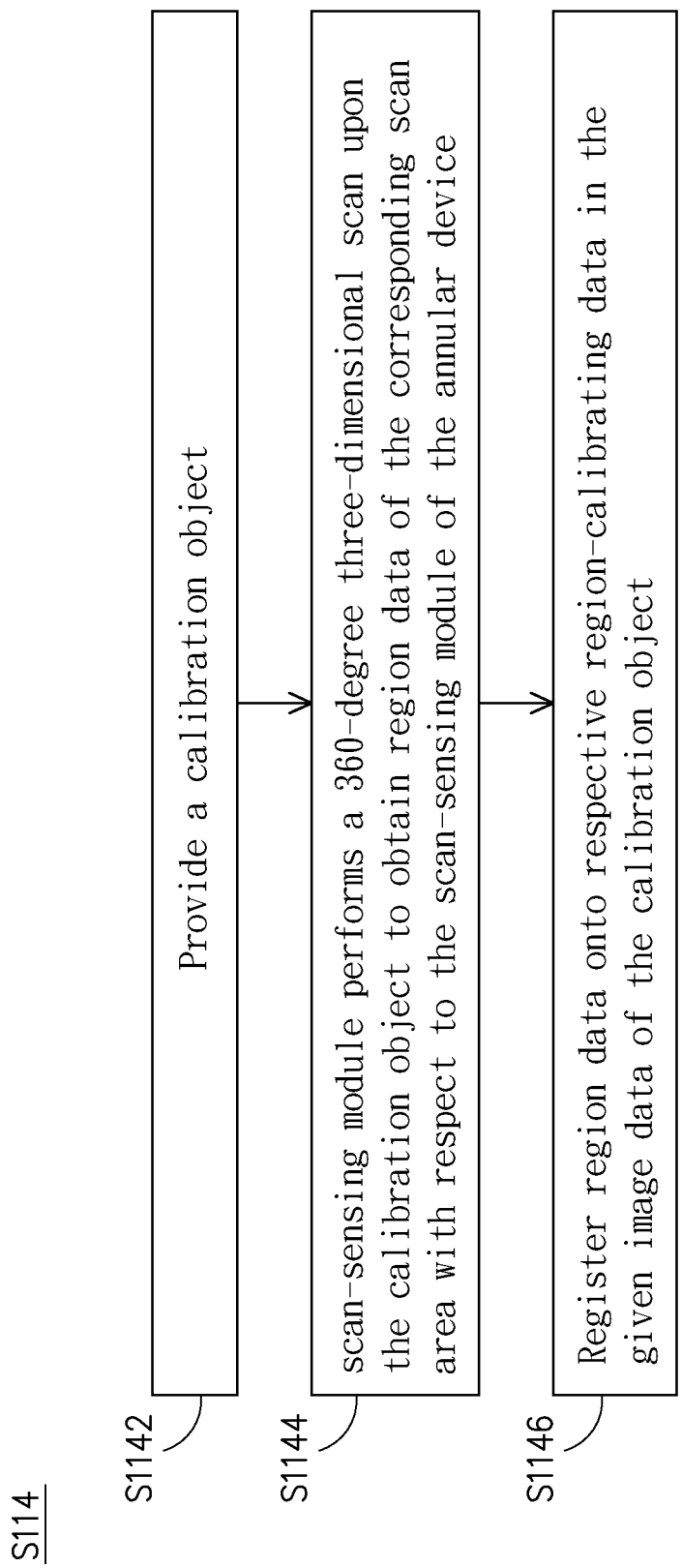
FIG. 5 is a schematic flowchart of an embodiment of Step S114 of FIG. 4.

After the 360-degree scan structure has been established in Step S112, then Step S114 is performed to calibrate each of the scan-sensing modules 122 so as thereby to obtain transformation coordinate data for each the scan-sensing module 122 of the annular device 124 with respect to the corresponding scan area. In this embodiment, a plurality of scan-sensing modules 122 have been mounted, then external parameters among these scan-sensing module 122 shall be corrected. The aforesaid external parameters could tell relationship of positions and angles among these scan-sensing modules 122. In details, referring now to FIG. 5, a schematic flowchart of an embodiment of Step S114 of FIG. 4 is shown. Step S114 of this embodiment further includes the following Step S1142~Step S1146. In Step S1142, a calibration object is provided, which the calibration object is a model to mimic the measured object. For example, if the measured object is a palm, then the calibration object would be a calibrated palm model. The calibration object includes given image data, and the given image data could further include two-dimensional data and three-dimensional data. For example, the two-dimensional data could be color data of the given image, and the three-dimensional data include three-dimensional spatial coordinate data, curvature data and scan area data of the given image. In one embodiment, a depth camera could be applied to scan the calibration object three-dimensionally so as to generate the two-dimensional data and the three-dimensional data of the calibration object. In other embodiments, the calibration object could be a given CAD (Computer aided design) file. In Step S1144, each the scan-sensing module 122 performs the 360-degree three-dimensional scan upon the calibration object so as to obtain region data of the corresponding scan area with respect to the scan-sensing module 122 of the annular device 124, where the region data include two-dimensional scan data and three-dimensional scan data. The three-dimensional scan data could include three-dimensional spatial coordinate data, curvature data and scan area data, and the two-dimensional scan data could include color data of the calibration object. In Step S1146, each individual region data could be mapped onto respective region-calibrating data in the given image data of the calibration object. In this embodiment, the given image data could be divided into a plurality of region-calibrating data. In an operation of registering feature points, the region-calibrating data of the region data are aligned with the corresponding given image data in each individual scan area, such that first transformation coordinate data could be obtained. For example, as shown in FIG. 1, a scan-sensing module 122 scans the calibration object at a scan area so as to obtain corresponding region data, while, in the given image data of the calibration object, region-calibrating data are included in correspondence with this scan area. Then, the image-processing module 126 receives both the region data and the region-calibrating data. Further, the image-processing module 126 analyzes the region data to locate feature points, and the region-calibrating data to locate another feature points. After having a plurality of feature points of the region data to form at least one first plane, a plurality of another feature points of the region-calibrating data to form at least one second plane, then the image-processing module 126 would perform a coordinate transformation to map the first plane onto the respective second plane, such that, during the transformation, first transformation coordinate data could be obtained. Then, the image-processing module 126 would apply an iterative closest point (ICP) algorithm to register the three-dimensional spatial coordinate of each region data onto the three-dimensional spatial coordinate of the corresponding region-calibrating data in the given image data of the calibration object so as to obtain the three-dimensional spatial coordinate after the mapping by performing coordinate transformation, such that, during the transformation, second transformation coordinate data could be obtained. Finally, the image-processing module 126 could obtain transformation coordinate data by the product of the first transformation coordinate data and the second transformation coordinate data. Thereupon, each the scan-sensing module 122 could obtain the transformation coordinate data for the scan area with respect to the annular device 124.

Referring to FIG. 4 again, after all the transformation coordinate data are obtained in Step S114, in Step S116, all the regional image data of the measured object with respect to the scan areas could be obtained by the respective scan-sensing modules 122 at the annular device 124. By having FIG. 2A as an example, each of the scan-sensing modules 122 captures the images orderly from the corresponding scan areas on the measured object 50. In another embodiment, individual wavelengths for imaging are set to respective scan-sensing modules 122, and thus all the scan-sensing modules 122 could perform image-capturing from the corresponding scan areas of the measured object 50 simultaneously. The image-capturing of the scan-sensing module 122 could be elucidated by reading the projection device 122A and the detection device 122B of FIG. 1. Each of the projection devices 122A projects an projection pattern with feature points onto the measured object 50 at the corresponding scan area with respect to the annular device 124, each of the detection devices 122B is applied to detect the reflected light and the scattered light by the measured object 50, originated from the respective projection device 122A, such that the image of the projection pattern in the respective scan area on the measured object 50 could be captured, so as the regional image data. Further, the regional image data of the corresponding scan area are transmitted to the image-processing module 126, in which the regional image data include two-dimensional image data and three-dimensional image data. In this disclosure, the three-dimensional image data could be three-dimensional spatial coordinate data, curvature data and scan area data of the scan area with respect to the measured object, while the two-dimensional scan data could be color data of the measured object. After Step S116 of obtaining the regional image data of the measured object, Step S118 is performed to base on the transformation coordinate data of the scan-sensing module 122 with respect to the scan area by the annular device 124 to transform each the three-dimensional spatial coordinate data into corresponding regional scan data. By having FIG. 2A as an example, after each of the scan-sensing modules 122 obtains corresponding three-dimensional spatial coordinate data with respect to the respective scan area, the image-processing module 126 would utilize the transformation coordinate data with respect to the corresponding scan area to transform each the three-dimensional spatial coordinate data into corresponding regional scan data.

Referring also to FIG. 3, as the 360-degree scan structure is formed, and after Step S110 of obtaining the regional scan data with respect to the plurality of different scan areas on the measured object, then Step S120 is performed. In Step S120, each of the regional scan data with respect to different scan areas are registered to form 360-degree three-dimensional scan data. By having FIG. 1 as an example, the image-processing module 126 bases on the three-dimensional spatial coordinate data and the curvature data with respect to the scan area of the measured object to perform a series of image-processing procedures such as a feature extraction, a feature points registering and an image alignment, so that the regional scan data of different scan areas are registered to form 360-degree three-dimensional scan data. In this disclosure, the 360-degree three-dimensional scan data include the three-dimensional spatial coordinate data and curvature data of the measured object and scan area data scanned by each the scan-sensing module.

Figure 6:
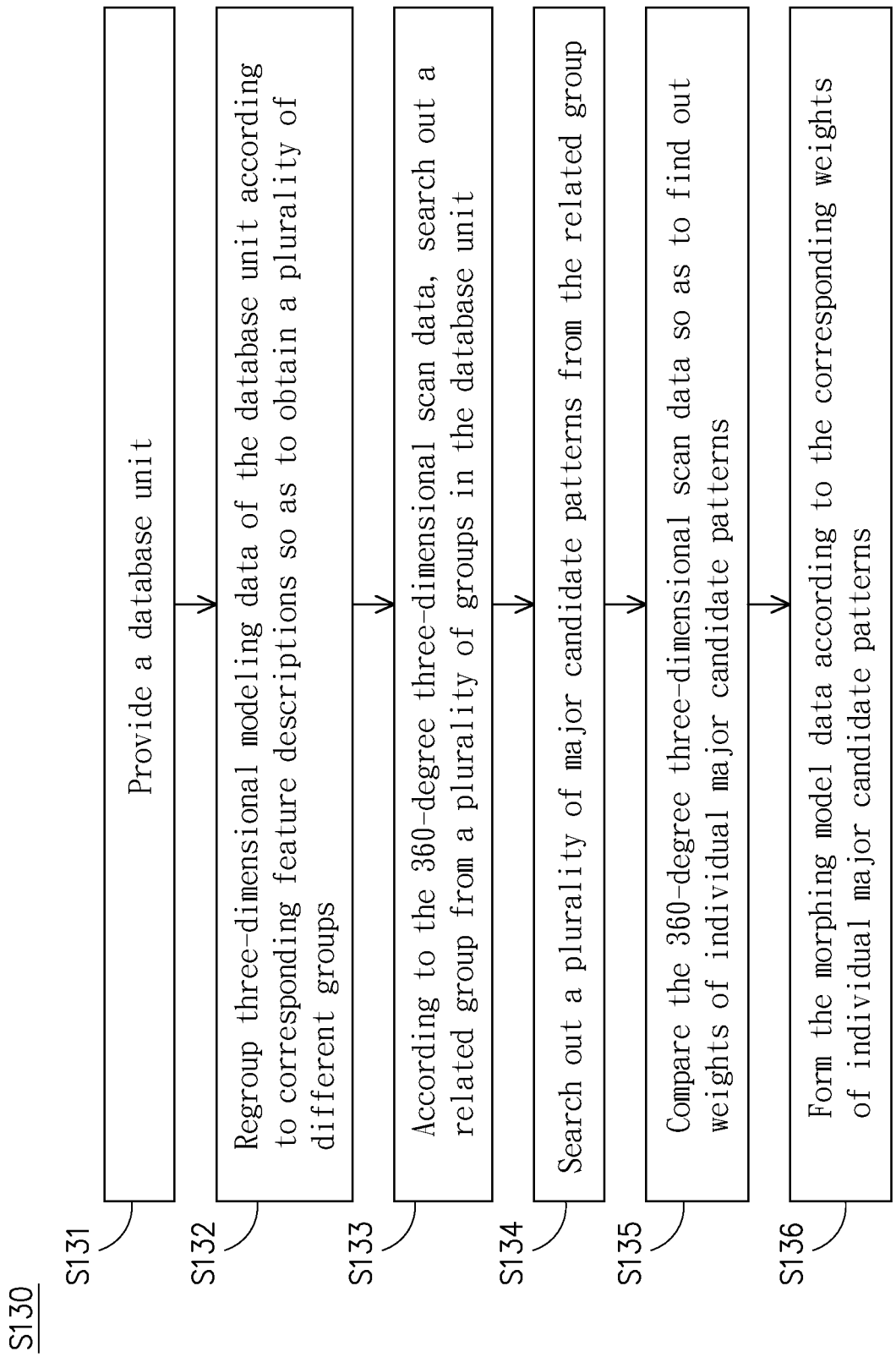
FIG. 6 is a schematic flowchart of an embodiment of Step S130 of FIG. 3.

Then, after Step S120 of forming the 360-degree three-dimensional scan data, in Step S130, based on the 360-degree three-dimensional scan data, a database unit 14 is utilized to search morphing model data. In details, as shown in FIG. 6, a schematic flowchart of an embodiment of Step S130 of FIG. 3 is shown. In Step S131, a database unit 14 is provided to access a plurality of different-type three-dimensional modeling data, where the three-dimensional modeling data are poses of various objects. Then, in Step S132, all three-dimensional modeling data of the database unit 14 are regrouped according to corresponding feature descriptions so as to obtain a plurality of different groups. In this embodiment, the three-dimensional modeling unit 16 would map each of the three-dimensional modeling data of the database unit 14 to a character space that has a lower dimension but is still able to describe the database unit 14. Practically, a principal components analysis (PCA) could be used for analysis and for simplifying data. For example, in the case that the three-dimensional modeling data are three-dimensional, then each of the three-dimensional modeling data could be mapped to a two-dimensional planar pattern. Then, according to the feature descriptions, the three-dimensional modeling data would be regrouped into a plurality of groups with respect to the feature descriptions. The aforesaid feature description could be the relation description upon parts of the measured object by the three-dimensional spatial coordinates, the curvatures and locations. By having the thumb and the index finger as an example, the thumb is the widest finger among five, and has a length just tip to one section of the neighboring index finger. A well-known L-shape gesture of hand is mainly composed by the thumb and the index finger. Here, the feature description is to define the relationship between the thumb and the index finger. In this embodiment, feature descriptions with respect to each of the three-dimensional modeling data are used for regrouping. Among a plurality of groups, overlapped portions between two groups may exist. Namely, some feature descriptions may appear simultaneously to at least one group. After Step S132 of regrouping to obtain a plurality of groups, then, in Step S133, according to the 360-degree three-dimensional scan data, a related group is searched out from a plurality of groups in the database unit 14. In this embodiment, according to the feature descriptions organized by the three-dimensional spatial coordinate data and the curvature data of the measured object and the scan area data of the scan-sensing modules in the 360-degree three-dimensional scan data, the three-dimensional modeling unit 16 compares the feature descriptions of the 360-degree three-dimensional scan data with the feature descriptions in individual groups of the database unit 14, so that a related group in the database unit 14 could be searched out. After Step S133 of searching out the related group, Step S134 is performed to search out a plurality of major candidate patterns from the related group. For example, if the three-dimensional modeling unit 16 searches out three major candidate patterns from the related group, then these three major candidate patterns could be used to define major feature description of the related group. However, the number of the major candidate patterns is dependent on practical settings. After Step S134 of searching out a plurality of major candidate patterns, Step S135 is performed to compare the 360-degree three-dimensional scan data so as to find out weights of individual major candidate patterns. For example, after the three major candidate patterns are located in Step S134, based on the feature descriptions organized by the three-dimensional spatial coordinate data and the curvature data of the measured object and the scan area data of the scan-sensing modules in the 360-degree three-dimensional scan data, ratios of individual major candidate patterns to fulfill the 360-degree three-dimensional scan data are determined, such that the individual weights of these three individual major candidate pattern could be found out. After Step S135 of finding out individual weights of the corresponding major candidate patterns, Step S136 is performed to form the morphing model data according to the corresponding weights of individual major candidate patterns. For example, after the weights for individual major candidate patterns are determined in Step S135, the three major candidate patterns are used to construct the morphing model data according to the weights of the corresponding major candidate patterns.

Figure 7:
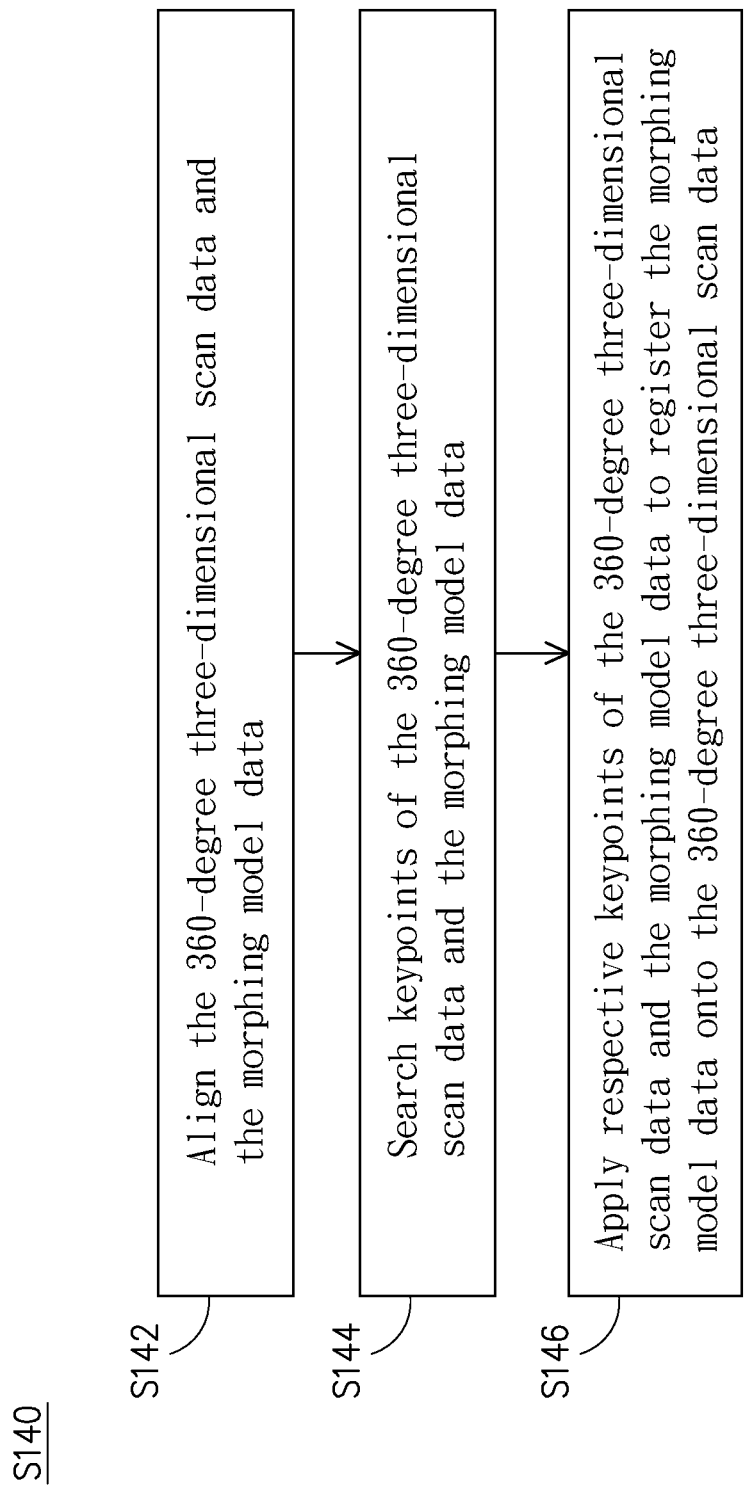
FIG. 7 is a schematic flowchart of an embodiment of Step S140 of FIG. 3.

Referring to FIG. 3, after Step S130 of searching the morphing model data, Step S140 is performed to compare the 360-degree three-dimensional scan data and to carry out registering and morphing processes upon the morphing model data, so that compensated-template three-dimensional model data could be constructed. In details, referring to FIG. 7, a schematic flowchart of an embodiment of Step S140 of FIG. 3 is shown. In Step S142, the 360-degree three-dimensional scan data are aligned with the morphing model data. In this embodiment, a linear method or a non-linear method could be applied to align the 360-degree three-dimensional scan data and the morphing model data. In one embodiment, the three-dimensional modeling unit 16 could apply an iterative closest point (ICP) algorithm for rough alignment so as to find out related feature points between the 360-degree three-dimensional scan data and the morphing model data. Then, the related feature points are applied to further align coordinates and orientations of the 360-degree three-dimensional scan data with those of the morphing model data. In this embodiment, the 360-degree three-dimensional scan data could provide the three-dimensional spatial coordinate data and the curvature data of the measured object and the scan area data of the scan-sensing modules to compare with the morphing model data. Then, the three-dimensional modeling unit 16 applies a non-linear method to perform accurate alignment upon the 360-degree three-dimensional scan data and the morphing model data, so that the coordinates of the 360-degree three-dimensional scan data could align precisely with those of the morphing model data.

After Step S142 of aligning the 360-degree three-dimensional scan data to the morphing model data, Step S144 is performed to search respective keypoints of the 360-degree three-dimensional scan data and the morphing model data. In selecting the keypoints, the three-dimensional modeling unit 16 could apply any available algorithm for selecting three-dimensional keypoints, such as an ISS (Intrinsic shape signature) algorithm, an NARF (Normal aligned radial feature) algorithm or a uniform sampling algorithm, to screen keypoints between the 360-degree three-dimensional scan data and the morphing model data. In screening keypoints from the 360-degree three-dimensional scan data, the three-dimensional spatial coordinate data and curvature data of the measured object and the scan area data scanned by the scan-sensing modules could be utilized. In Step S146, respective keypoints of the 360-degree three-dimensional scan data and the morphing model data are applied to register the morphing model data onto the 360-degree three-dimensional scan data, such that the morphing model data would be deformed to construct the compensated-template three-dimensional model data. In this embodiment, these keypoints would be labeled on by relevant descriptors, and a spin image algorithm would perform comparison of similarity upon descriptors between the 360-degree three-dimensional scan data and the morphing model data, such that the morphing model data could be registered onto the 360-degree three-dimensional scan data so as to deform the morphing model data to further form the compensated-template three-dimensional model data.

Referring to FIG. 3, after Step S140 of forming the compensated-template three-dimensional model data, Step S150 is performed to base on the compensated-template three-dimensional model data to fill at least one unknown area of the 360-degree three-dimensional scan data. In this embodiment, the unknown area includes holes (boundaried regions) caused by damages and open areas (boundaryless regions) caused by shadows while in scanning the 360-degree three-dimensional scan data.

In summary, in the three-dimensional modeling method and the three-dimensional modeling system provided by this disclosure, the three-dimensional image-data capturing unit is introduced to form the hardware framework for the scan-sensing module to have corresponding calibrated transformation coordinate data, so as thereby to improve integrity and accuracy of the 360-degree three-dimensional scan data. Further, the 360-degree three-dimensional scan data are applied to increase the alignment precision and thus to enhance the filling efficiency of imaging.

Further, the system and method of this disclosure are not simply to fill holes found by detecting the boundaried regions, but apply machine learning to search the morphing model data resembling the measured object from the database unit. Then, a linear method or/and a non-linear method are applied to align the morphing model data and the 360-degree three-dimensional scan data, so that the morphing model data would be deformed to form the compensated-template three-dimensional model data. In this disclosure, since the compensated-template three-dimensional model data are compact data resembling the measured object, the compensated-template three-dimensional model data could be based to fill the boundaryless open areas shadowed in the 360-degree three-dimensional scan data. Namely, the system and method provided by this disclosure could fill and thus regenerate both the boundaried holes and the boundaryless open areas, such that the three-dimensional model could be constructed much more accurately and completely.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A three-dimensional modeling method, comprising:
    performing a 360-degree three-dimensional scan on a measured object to obtain regional scan data corresponding to a plurality of different scan areas of the measured object;
    registering the regional scan data to form 360-degree three-dimensional scan data, wherein the 360-degree three-dimensional scan data include three-dimensional spatial coordinate data, curvature data and scan area data of the measured object;
    searching corresponding morphing model data from a database unit based on the 360-degree three-dimensional scan data;
    comparing the 360-degree three-dimensional scan data and performing registering and morphing processes on the morphing model data to construct compensated-template three-dimensional model data; and
    filling at least one unknown area of the 360-degree three-dimensional scan data based on the compensated-template three-dimensional model data;
    wherein comparing the 360-degree three-dimensional scan data and performing registering and morphing processes on the morphing model data to construct a compensated-template three-dimensional model data further comprises:
        aligning the 360-degree three-dimensional scan data and the morphing model data;
        searching a plurality of keypoints in the 360-degree three-dimensional scan data and another plurality of keypoints in the morphing model data; and
        utilizing the respective keypoints of the 360-degree three-dimensional scan data and the morphing model data to register the morphing model data to the 360-degree three-dimensional scan data, so that the morphing model data are deformed to construct the compensated-template three-dimensional model data.

2. The three-dimensional modeling method of claim 1, wherein performing a 360-degree three-dimensional scan on a measured object further comprises:
    furnishing at least one scan-sensing module to an annular device for forming a 360-degree scan structure;
    calibrating each of the at least one scan-sensing module for the scan-sensing module at the annular device to obtain transformation coordinate data with respect to corresponding scan area on the measured object;
    applying each said scan-sensing module at the annular device to obtain corresponding regional image data with respect to the scan area on the measured object; and
    transforming the three-dimensional spatial coordinate data to the respective regional scan data based on the transformation coordinate data with respect to the corresponding scan area on the measured object.

3. The three-dimensional modeling method of claim 2, wherein calibrating each of the at least one scan-sensing module further comprises:
    providing a calibration object, wherein the calibration object is a model fulfilling the measured object and comprises given image data;
    performing the 360-degree three-dimensional scan on the calibration object for the scan-sensing module at the annular device with each said scan-sensing module to obtain region data of the calibration object with respect to the scan area; and
    registering the region data onto corresponding region-calibrating data in the given image data of the calibration object.

4. The three-dimensional modeling method of claim 1, wherein searching morphing model data from a database unit further comprises:
    accessing a plurality of different-type three-dimensional modeling data in the database unit;

regrouping the three-dimensional modeling data of the database unit into a plurality of groups according to feature descriptions;

searching out a related group from the plurality of groups in the database unit based on the 360-degree three-dimensional scan data;

searching the related group to determine a plurality of major candidate patterns;

comparing the 360-degree three-dimensional scan data to determine corresponding weights of the respective major candidate patterns; and constructing the morphing model data based on the weights of the major candidate patterns.

5. The three-dimensional modeling method of claim 1, wherein aligning the 360-degree three-dimensional scan data and the morphing model data is performed by carrying out an iterative closest point (ICP) algorithm.

6. The three-dimensional modeling method of claim 1, wherein aligning the 360-degree three-dimensional scan data and the morphing model data is performed by carrying out a linear method, a non-linear method, or a combined linear and non-linear method.

7. The three-dimensional modeling method of claim 1, wherein searching a plurality of keypoints in the 360-degree three-dimensional scan data and another plurality of keypoints in the morphing model data is performed by carrying out an algorithm selected from the group consisting of an ISS (Intrinsic shape signature) algorithm, a NARF (Normal aligned radial feature) algorithm and a uniform sampling algorithm.

8. The three-dimensional modeling method of claim 1, wherein the at least one unknown area comprises at least one boundaryless open area.

9. A three-dimensional modeling system, comprising:
a three-dimensional image-data capturing unit, outputting 360-degree three-dimensional scan data, wherein the 360-degree three-dimensional scan data comprises three-dimensional spatial coordinate data, curvature data and scan area data of a measured object;
a database unit, coupling the three-dimensional image-data capturing unit, being to access a plurality of different-type three-dimensional modeling data; and
a three-dimensional modeling unit, coupling the database unit and the three-dimensional image-data capturing unit, searching corresponding morphing model data from the database unit based on the 360-degree three-dimensional scan data, comparing the 360-degree three-dimensional scan data and performing registering and morphing processes on the morphing model data to construct compensated-template three-dimensional model data from the database unit, and filling at least one unknown area of the 360-degree three-dimensional scan data based on the compensated-template three-dimensional model data, wherein the at least one unknown area comprises at least one boundaryless open area;
wherein the three-dimensional modeling unit regroups the three-dimensional modeling data of the database unit into a plurality of groups according to feature descriptions, determining a related group from the plurality of groups in the database unit based on the 360-degree three-dimensional scan data, searching the related group to determine a plurality of major candidate patterns, comparing the plurality of major candidate patterns to the 360-degree three-dimensional scan data to determine corresponding weights of respective major candidate patterns, and constructing the morphing model data based on the weights of the major candidate patterns;

wherein the three-dimensional modeling unit aligns the 360-degree three-dimensional scan data and the morphing model data, searches a plurality of keypoints in the 360-degree three-dimensional scan data and another plurality of keypoints in the morphing model data, and utilizes respective keypoints of the 360-degree three-dimensional scan data and the morphing model data to register the morphing model data to the 360-degree three-dimensional scan data, such that the morphing model data are deformed to construct the compensated-template three-dimensional model data.

10. The three-dimensional modeling system of claim 9, wherein the three-dimensional image-data capturing unit comprises:
at least one annular device; and
at least one scan-sensing module, mounted at the annular device, being to form a 360-degree scan structure.

11. The three-dimensional modeling system of claim 10, wherein the at least one scan-sensing module comprises a plurality of said scan-sensing modules mounted individually at the at least one annular device for being responsible for a plurality of different scan areas.

12. The three-dimensional modeling system of claim 10, wherein the at least one annular device comprises one single said annular device, and the at least one scan-sensing module comprises one single said scan-sensing module; wherein the annular device is rotated to position the scan-sensing module at different locations at the annular device so as to perform scanning upon the corresponding scan areas.

13. The three-dimensional modeling system of claim 10, wherein the scan-sensing module at the annular device is calibrated to obtain transformation coordinate data with respect to the corresponding scan area, and the three-dimensional spatial coordinate data are transformed to the corresponding regional scan data according to the transformation coordinate data.

14. The three-dimensional modeling system of claim 10, wherein the scan-sensing module comprises a projection device and a detection device coupled with the projection device.

15. The three-dimensional modeling system of claim 14, wherein the three-dimensional modeling unit aligns the 360-degree three-dimensional scan data and the morphing model data by carrying out an iterative closest point (ICP) algorithm.

16. The three-dimensional modeling system of claim 14, wherein the three-dimensional modeling unit aligns the 360-degree three-dimensional scan data and the morphing model data by carrying out a linear method, a non-linear method, or a combined linear and non-linear method.

17. The three-dimensional modeling system of claim 14, wherein the three-dimensional modeling unit searches the plurality of keypoints in the 360-degree three-dimensional scan data and the another plurality of keypoints in the morphing model data by carrying out an algorithm selected from the group consisting of an ISS (Intrinsic shape signature) algorithm, a NARF (Normal aligned radial feature) algorithm and a uniform sampling algorithm.

* * * * *